United States Patent
Chidambaram

(10) Patent No.: US 9,247,059 B1
(45) Date of Patent: Jan. 26, 2016

(54) PRIORITY TOKEN-BASED INTERACTIVE VOICE RESPONSE SERVER

(71) Applicant: Verizon Patent and Licensing Inc., Arlington, VA (US)

(72) Inventor: Vijayanand Chidambaram, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/531,456

(22) Filed: Nov. 3, 2014

(51) Int. Cl.
*H04M 3/00* (2006.01)
*H04M 3/51* (2006.01)
*H04M 3/42* (2006.01)
*H04M 3/22* (2006.01)
*H04M 3/523* (2006.01)

(52) U.S. Cl.
CPC .......... *H04M 3/5166* (2013.01); *H04M 3/2218* (2013.01); *H04M 3/42042* (2013.01); *H04M 3/5238* (2013.01)

(58) Field of Classification Search
CPC ............ H04M 3/5183; H04M 3/5191; H04M 3/5175; H04M 3/523; H04M 3/5232; H04M 3/5238; H04M 3/493; H04M 3/4936; H04M 3/4221; H04M 3/5166

USPC ............ 379/265.01–265.02, 265.09, 266.01, 379/266.06, 67.1–88.01
See application file for complete search history.

(56) References Cited

U.S. PATENT DOCUMENTS

| | | | |
|---|---|---|---|
| 8,489,507 B1 * | 7/2013 | Dayalan ............... | G06Q 20/401 705/44 |
| 8,654,934 B2 * | 2/2014 | Saylor ................... | H04M 3/493 379/265.09 |
| 2003/0185379 A1 * | 10/2003 | O'Connor ........... | H04L 12/5855 379/265.02 |

* cited by examiner

*Primary Examiner* — Rasha Al Aubaidi

(57) ABSTRACT

An Interactive Voice Response Server ("IVR Server") generates a session identifier ("session ID") to identify and track a session during an initial communication connection. Upon resolving menu selection identifiers that are received from a first communication device to a queue of sessions, the IVR Server stores the session ID in a queue table for the queue. Next, the IVR Server determines an estimated wait time, generates a token, and links the estimated wait time and the token to the session by mapping the token and the estimated wait time to an entry of the session ID in the queue table. Finally, the IVR Server transmits the estimated wait time and the token to the first communication device. In a subsequent communication connection, the session can be accessed on the same or a different device as the session progresses through the queue based on the token.

20 Claims, 6 Drawing Sheets

*FIG. 4A*

400 Queue Resolution Table

| Queue ID | Subject | Menu Selection |
|---|---|---|
| A | Billing | 1 |
| B | New Order | 2 |
| C | Transfer Service | 3 |
| D | Activation | 4 |
| E | Problem, Mobile | 5, 1 |
| F | Problem, Landline | 5, 2 |
| N | Problem, Internet | 5, 3 |

*FIG. 4B*

420 Queue E

| Token (10 Digit Telephone No., Date, Time) | Session ID | Estimated Wait Time | Status |
|---|---|---|---|
| 0123456789082220140940 | 1234500 | 15 | Priority |
| 0234567890182220140942 | 1234520 | 16 | Waiting |
| ... | ... | ... | ... |
| 1234567890082220141001 | 1234566 | 22 | Disconnected |
| 2345678901082220141002 | 1234567 | 24 | Disconnected |
| 3456789012082220141002 | 1234568 | 26 | Disconnected |
| ... | ... | ... | ... |

*FIG. 4C*

445 Queue E Removal Table

| Token | Session ID | Estimated Wait Time | Total Session Time |
|---|---|---|---|
| 1234567890082220141001 | 1234566 | 22 | 28 |
| 1234567890082220141001 | 1234567 | 24 | 30 |
| 3456789012082220141002 | 1234568 | 26 | 32 |

PRIORITY TOKEN-BASED INTERACTIVE VOICE RESPONSE SERVER

BACKGROUND

A call center receives calls for customer support, payment, or other requests for information from customers pertaining to a company, product, or service. The call center typically receives a large volume of telephonic inquiries, routes those inquiries to knowledgeable persons to handle the inquiries, and then responds to the inquiries. In a contact center, customers are also routed to persons with pertinent information during a phone call, but customers can also interact via email, online chat, instant messaging, etc. The callers, however, are often displeased if subjected to long wait times.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4A is an example of a database structure employed to resolve a set of menu selection identifiers to a queue.

FIG. 4B is an example of a database table structure employed to implement a queue.

FIG. 4C is an example of a database structure generated to store priority token-based sessions that are removed from a queue.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Unfortunately, when a customer engages in communications with a contact center today, the customer waits for a period of time, typically 10 to 20 minutes, to speak to an agent in the center. The previous technology fails to provide a solution to significantly reduce the wait time that the customer experiences in the contact center.

In the present solution, an Interactive Voice Response Server ("IVR Server") may receive a first telephony connection request from a telephony device. The term "telephony device" includes a mobile device or a landline telephony device, both of which are described in detail below. The IVR Server generates a session identifier ("session ID") to identify and track a session for a first call connection associated with the first telephony connection request.

Upon resolving a set of menu selection identifiers that are received from the telephony device to a queue of call sessions, the IVR Server stores the session ID in a queue table for the queue. Next, the IVR Server determines an estimated wait time with respect to the indicated queue, generates a token, and links the estimated wait time and the token to the session by mapping the token and the estimated wait time to a same entry as the session ID in the queue table. Finally, the IVR Server transmits the estimated wait time and the token to the telephony device. In a subsequent call, the session can be accessed via a second call connection from the same or a different device as the session progresses through the queue based on the token.

Figure 1:
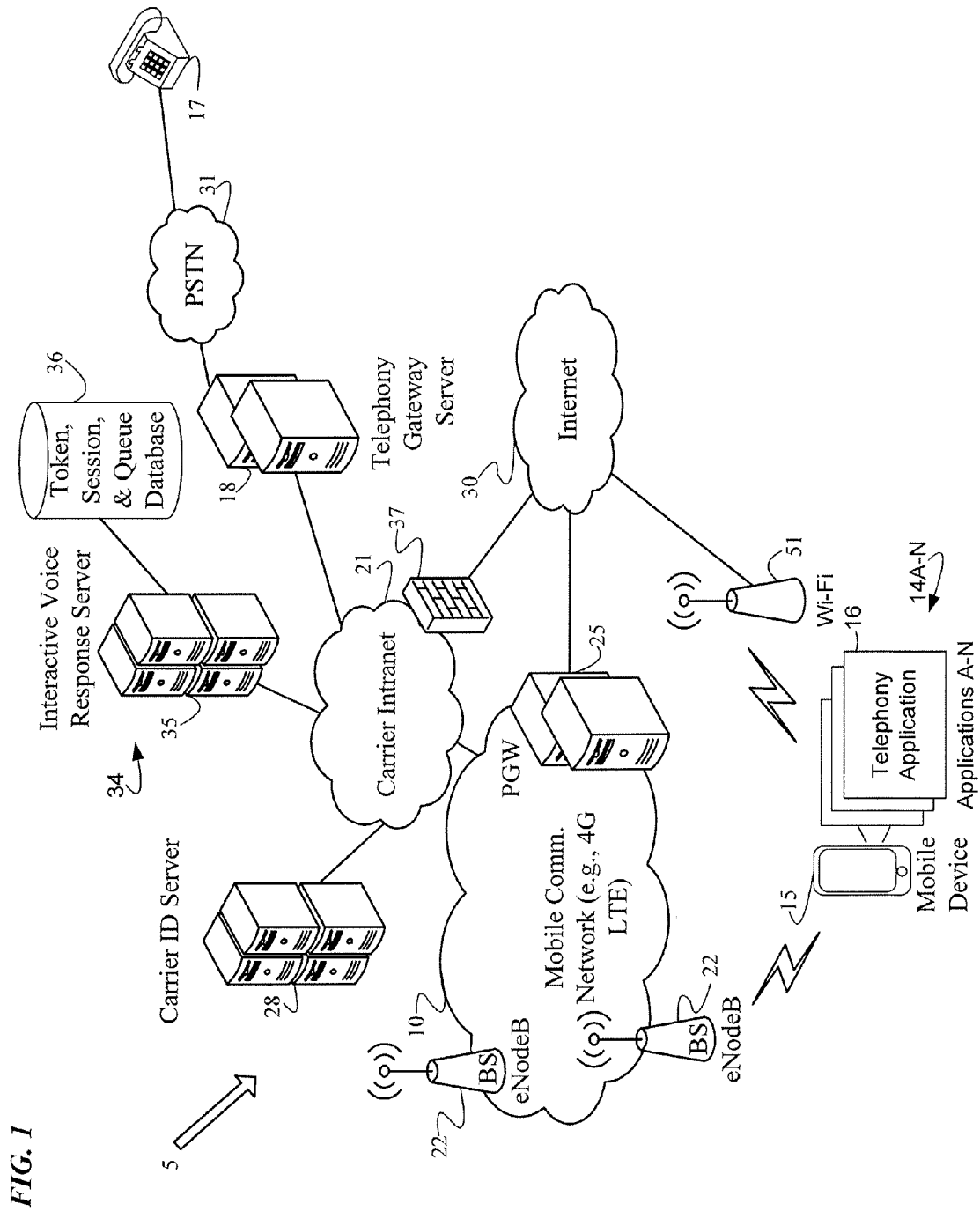
FIG. 1 is a high-level functional block diagram of an example of a system of networks and devices that provide a variety of communication services, including communications with a priority token-based Interactive Voice Response Server.

Reference now is made in detail to the examples illustrated in the accompanying drawings and discussed below. FIG. 1 illustrates a functional block diagram of a system 5 that supports communications for a priority token-based Interactive Voice Response Server.

The illustrated system 5 includes a mobile communication network 10, in this case, operated in accordance with fourth generation (4G) Long Term Evolution (LTE) standards, although other wireless networks at least supporting data and voice communications may be used. The 4G LTE mobile network 10 in the example provides mobile telephone communications as well as Internet data communication services. For example, mobile network 10 may connect to public packet-switched data communication networks such as the Internet 30 via a packet gateway (PGW) server 25. Data communications via mobile network 10 with network connected equipment, provided for a user/subscriber of mobile device 15, may support a variety of services such as communications of text and multimedia messages, e-mail, web browsing, streaming or downloading content, etc.

In our discussion, the mobile device 15 uses packet communications via a mobile network 10, Intranet 21, and the Internet 30, which typically would utilize packet transport and Internet Protocol ("IP"), including for voice calls and related communications. The mobile device 15, here, however, can utilize other networks, other forms of network transport, and/or other protocols for the relevant communications. For example, Voice communication may involve transport via the Internet 30 using voice over Internet Protocol ("VoIP") technologies; although additional networking equipment (not shown) may be provided for separate voice transport, e.g. if the network 10 utilizes wireless communication technologies offering traditional circuit switched transport for voice telephone type services.

As shown, system 5 includes a mobile device 15, which is typically a regular mobile telephony device with a subscription to carrier provided services of network 10, including data and voice services of the mobile communications network 10. In the example, a carrier is an entity that operates a network, such as mobile network 10, and the mobile network carrier is the entity that operates network 10 to provide services to one or more mobile device(s) 15 of users/subscribers. Mobile device 15 can be a laptop, personal digital assistant ("PDA"), smartphone, tablet computer, portable game or media player with wireless communication elements, or other portable device designed to communicate via one or more wireless networks, including packet-switched or circuit-switched transport networks.

Mobile device 15 wirelessly connects to mobile network 10 through a cellular base station (BS) 22 to communicate, two of which appear in the drawing by way of example. The mobile device 15 in the example corresponds to a smartphone and includes a universal integrated circuit card ("UICC") with subscriber identity module ("SIM") credentials, such as a traditional SIM card, code division multiple access ("CDMA") SIM (collectively, "CSIM"), universal SIM ("USIM"), or IP Multimedia SIM ("ISIM").

In our illustration, the mobile device 15 engages in communications with Interactive Voice Response Server ("IVR Server") 35. Such communications typically take place through the carrier network(s) during voice and data communications when the customer places a call to a contact center 34. The contact center 34 includes the IVR Server 35 and a token, session, & queue database 36. Communications with the IVR Server 35 may take place without the carrier's involvement, and in such situations mobile device 15 may be in direct communication with the IVR Server 35 over the Internet, such as via the Internet 30 through other wireless or wired media, such as a WiFi connection 51. When communications take place without the carrier's involvement a conventional personal computer ("PC") device (not shown) that communicates via a WiFi connection 51 or a wired network connection may be used.

In another example, a landline telephony device 17 that is connected to the public switched telephone network ("PSTN") 31 may communicate with the IVR Server 35. Accordingly, a Telephony Gateway Server 18 is also in communication via the carrier Intranet network 21 and builds a bridge to connect voice over IP ("VoIP") phone systems with legacy telephone systems, such as PSTN 31. The Telephony Gateway Server 18 can be used, for example, to convert between VoIP protocols and traditional integrated services for digital network ("ISDN") protocols used in circuit-switched telephone networks, e.g., serving analog telephone lines. In addition, Telephony Gateway Server 18 can even convert VoIP calls from one code to another, to bridge multiple VoIP technologies together. To provide these services, Telephony Gateway Server 18 is typically a software switch that includes interfaces to both IP networks and the PSTN 31.

As shown, mobile device 15 includes a telephony application 16 to engage in voice communications with the IVR Server 35. Such a telephony application 16 may include a voice application that is developed by the carrier or a third party application downloaded through an application store, such as Skype. In another example, data communications, such as email, online chat, instant messaging, may be exchanged between other applications 14A-N, such as a web browser, email, or chat of the mobile device 15 or PC device (not shown) and the Interactive Voice Response Server 35.

Mobile device 15 has a network communication capability and one or more physical elements for providing a user interface. Internally, mobile device 15 typically includes one or more wireless transceivers for data communication, a processor configured/connected to control device operation, a memory, and programming. As discussed more later, mobile device 15 also includes one or more physical elements for input, and is programmed or otherwise configured to perform various functions involved in the priority token communications.

The carrier that operates the network 10 will also utilize a variety of other systems for related purposes, such as network maintenance, accounting, and provisioning. In the example, the carrier has another data network, e.g. Intranet 21, that provides data communications for other data systems used by the carrier; and that Intranet 21 has connectivity into the network 10 that provides the actual communications services to the carrier's customers/subscribers. Examples of carrier systems that reside in or communicate via the Intranet 21 include systems for maintaining account records and for processing of network usage data for billing purposes, as well as servers for subscriber identification or authentication, such as a Carrier Identification ("ID") Server 28. The Intranet 21 is connected to the Internet 30 via routing and protective gear generally represented by the firewall 37.

In the example, Interactive Voice Response Server 35 resides on the carrier Intranet 21. To handle interactions between a customer using mobile device 15 and the contact center 34, the IVR Server 35 accesses the token, session, & queue database 36. The IVR Server 35 is tasked with segmenting customer inquiries to the contact center 34 into appropriate queues to put customers in communication with personnel having pertinent knowledge to handle specific types of customer inquiries.

In the illustrated telecommunications environment, IVR Server 35 handles interactions between a customer using mobile device 15 or landline telephone 17 and the contact center based on telephonic key pad touches that select menu items as the customer navigates through an interactive menu dialogue. When the IVR Server 35 operates as a voice portal, the keypad may be a conventional hard keypad, e.g. on landline telephone 17 that uses dual-tone multi-frequency signals or a soft touch keypad, e.g., on a smart mobile device such as shown at 15.

When a user selects a menu identifier from the IVR menu, the IVR Server 35 may respond to that selection with recorded digital or analog audio content to direct customer/ users on how to further proceed, in order to route customers into appropriate queues that group customers with similar subject matter inquiries. When the customer reaches the front of a queue, an agent at the contact center 34 who is in possession of knowledge that is relevant to the subject matter will respond to the customer's inquiry.

An example of an IVR menu, may include "press 1 for billing, 2 for a new order, 3 to transfer service, 4 for activation, 5 for a technical problem." The IVR Server 35 determines when a set of menu command selections that are received from the mobile device 15 or telephone 17 via touchtone input or speech are sufficient to identify a particular type of inquiry, and then resolves that inquiry to an appropriate queue. The interactive menu of the IVR Server 35 may be written using a high level scripting language, such as Voice Extensible Markup Language ("XML").

Alternatively, IVR Server 35 interacts with mobile device 15 or telephone 17 through the use of speech recognition of voice commands in order to interpret the customer's response(s) to voice prompts and then routes the customer into an appropriate queue of call sessions in response to the recognized voice commands.

The IVR Server 35 can engage in voice communications with mobile device 15 or PC device (not shown) using VoIP communications over the Internet 30. To engage in such VoIP communications, the IVR Server 35 can utilize the session initiation protocol ("SIP") or the Skype protocol. To engage in text-based communications, such as instant messaging or emails, with the user of mobile device 15 or PC device (not shown), the IVR Server 35 may use natural language processing to route the user into a queue instead of key pad touches or speech recognition.

To complete the discussion of FIG. 1, the drawings and description use terms like base station (BS) originally developed to describe elements of older mobile network technologies. The terms are used here, however, in a broader sense to also encompass equipment used for similar wireless link and routing/control purposes in more modern network technologies. In a 4G wireless network, for example, each wireless access node corresponding to one of the illustrated base stations may take the form of a node referred to as an eNodeB 22 and the wireless mobile devices are types of user equipment (UE) devices. Packet routing and control functions may be implemented in packet routers and/or associated server platforms in the radio access network (RAN) or in many cases in elements of an IP Multimedia Service (IMS) core network (not shown separately) coupled to some number of 4G LTE type RANs, although such routing and control element(s) are generically included in the broad class of devices that may be used to implement the functionality of network 10 discussed here.

Figure 2:
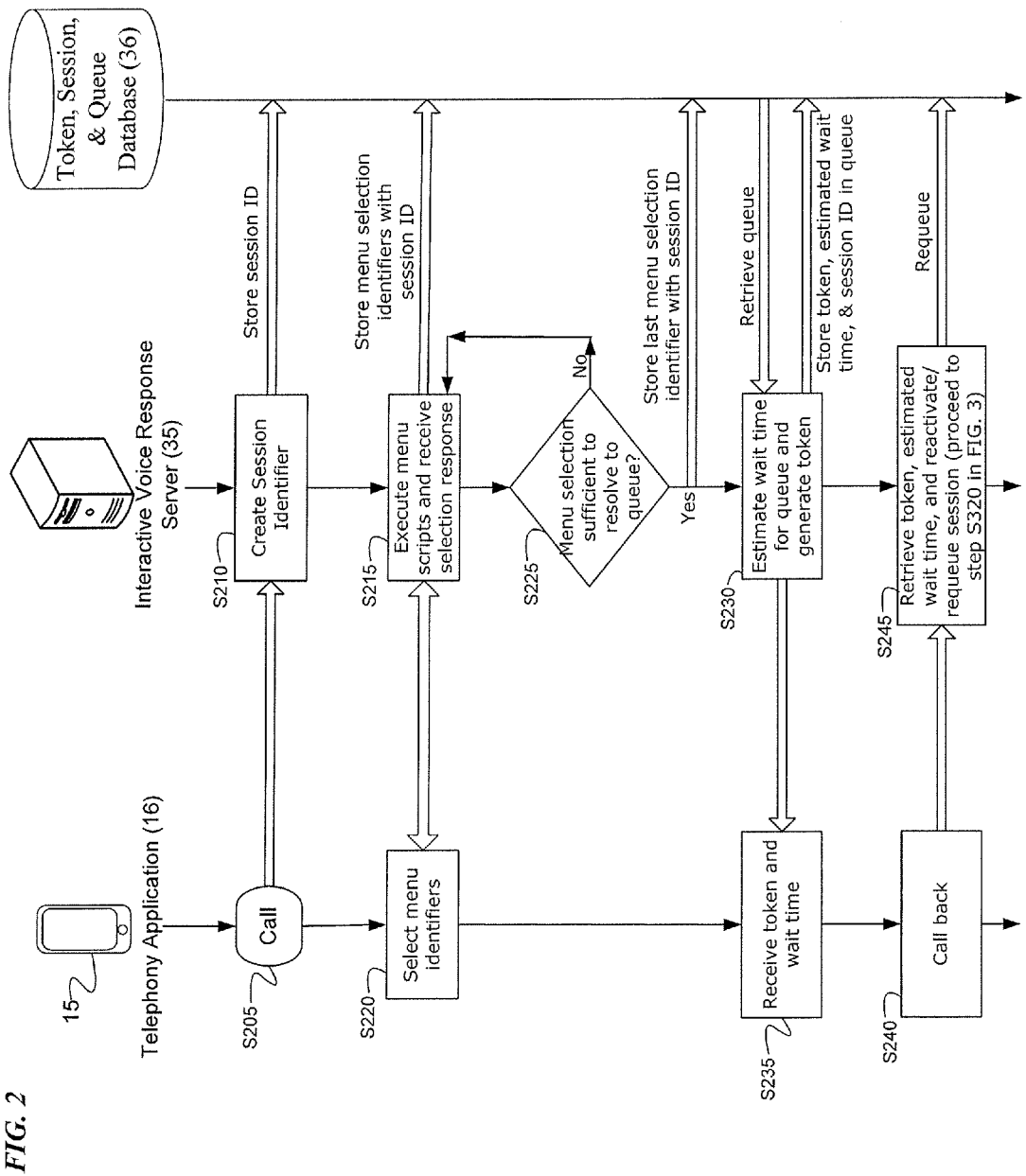
FIG. 2 is a flow chart of a procedure for generating and assigning a priority token using an Interactive Voice Response Server during an initial communication connection.

FIG. 2 illustrates a flow chart of a procedure for generating and assigning a priority token using an IVR Server 35 during an initial communication connection, such as an initial call. In the illustrated example, the mobile device 15 is in communication with the carrier network 10.

To initiate the procedure, in step S205, the telephony application 16 that resides on mobile device 15 initiates a call to a phone number directed to handling customer support inquiries and is then routed to IVR Server 35 of the contact center. The telephony application 16 places the outgoing call in response to receiving touchtone key input from the user. As part of this first communication connection, the telephony application 16 transmits caller identification ("caller ID") information to the IVR Server 35. Such caller ID information can include the caller's telephone number, which in the illustrated example is the mobile directory number ("MDN") of a first communication device (e.g., mobile device 15). Alternatively, the caller ID information may be a SIP address, IP address, international mobile equipment identity ("IMEI"), or temporary international mobile subscriber identity ("TIMSI") of the first communication device (e.g., mobile device 15), each of which may be may be transmitted to the IVR Server 35 from the mobile device 15 or other devices and servers, such as Carrier ID Server 28.

In step S210, the IVR Server 35 sets up a new session to identify the exchange between the telephony application 16 of mobile device 15 and IVR Server 35 for an initial call connection associated with the first communication connection. In the example, the session corresponds to the active call and the state changes that occur during the interactive call dialog. In conjunction with the session, IVR Server 35 generates a unique session identifier ("session ID") to identify and track the each step and change in the call session. Typically, the session ID is used to track and manage the state of the session. The session ID may be a globally unique identifier, such as 32 character alphanumeric string, and is assigned when the session is instantiated.

Continuing now to step S215, after generating the session ID, the IVR Server 35 plays or executes communication menu scripts, such as audio menu scripts, and transmits such digital audio data back to telephony application 16 of mobile device 15. Although not shown in this example, analog audio data may be transmitted when communications take place between IVR Server 35 and telephone 17 over the PSTN 31.

In step S220, in response to receiving the audio scripts, the user of the telephony application 16 navigates through the menu scripts using touchtone key inputs or spoken audio commands to select menu identifiers in order to be routed to a specific queue that can provide the type of information that the user seeks. Such touchtone key inputs or spoken audio commands can be transmitted back to the IVR Server 35 as digital audio data.

Turning back to step S215, one or more selections of menu identifiers are received by IVR Server 35 from the telephony application 16. Each received menu selection identifier is stored in the token, session, & queue database 36 and linked to the session ID.

Moving now to step S225, with each received menu selection identifier, the IVR Server 35 determines whether the received set of menu selection identifiers is sufficient to route the initial call connection associated with the session ID to a queue indicated (e.g., designated) by a queue identifier that is stored in a queue resolution table (see FIG. 4A). Each queue provides tailored services for a corresponding selection of menu identifiers, thus a group of queues segments the customer population into subsets based on the information that is sought. When the menu selection identifiers received are sufficient to segment the user/customer to a distinct queue corresponding to that set of menus selection identifiers, the session ID of the session has resolved to a queue. After the session has resolved to a queue, the last menu selection identifier may be stored in the token, session, & queue database 36 and linked to the session ID.

In step S230, upon resolving the session to a queue, the indicated queue that the session ID has been resolved to is retrieved. The queue includes a list, such as a first-in first-out table of session IDs. The initial call connection is typically not stored in the queue; however, the initial call connection is linked to the session ID when the initial call is set up. The estimated wait time with respect to the indicated queue is determined based on the size of the queue, such as the number of stored session IDs, the number of contact center agents available to handle the stored session IDs, and the average agent time taken to resolve the inquiry types handled in that particular queue. IVR Server 35 retrieves these parameters from the token, session, & queue database 36 and determines an estimated wait time by, for example, multiplying the number of stored session IDs by the average agent time and dividing that result by the number of agents available. The IVR Server 35 subsequently generates a token and maps that token along with the estimated wait time to the same location in the queue as the session ID in order to link the generated token and estimated wait time with the session ID entry in the queue. The token may be a 22 digit number, including for example, the ten digit telephone number received as the caller ID information, such as the MDN of the mobile device 15, embedded as a device identifier field, followed by an eight digit string of the current date in the form of month/day/year (MM/DD/YYYY) embedded as a field, and a four digit string of the current time (HH:MM) embedded as a field. Alternatively, a SIP address, IP address, IMEI, or TIMSI of the mobile device 15 may be embedded in the token in the device identifier character field instead of the telephone number or MDN of the mobile device 15.

The IVR Server 35 transmits the estimated wait time and token back to the telephony application 16 of mobile device 15. The estimated wait time and token can be transmitted as an audible voice communication or via short message server ("SMS") messaging, email messaging, etc.

In step S235, upon receiving the estimated wait time and token data, mobile device 15 may act on the received data by outputting the token and estimated wait time as audio or visually displaying the data via an application 14A-N. After the estimated wait time and token data is received by mobile device 15, the user subsequently terminates the call (step not shown). When the user terminates (i.e., disconnects) the call to deactivate the session, the token, session ID, estimated wait time, and menu selection identifiers persist (i.e., are maintained) in the token, session, & queue database 36. In other words, the session corresponding to the session ID and the linked token is not torn down when the call is terminated. Thus, the token can be used to access the session on the same or a different device as the session progresses through the queue. Alternatively, after receiving the token and the estimated wait time, if the user decides that the estimated wait time is short enough (e.g., less than 5 minutes), then IVR Server 35 permits the user to wait on the line and maintain the initial call connection.

Continuing now step S240, after termination of the first communication connection (e.g., initial call), the telephony application 16 of mobile device 15 places a subsequent call that is routed to the IVR Server 35. As discussed in further detail in the steps of FIG. 3, in step S245, upon receiving caller ID information, the IVR Server 35 searches the token, session, & queue database 36 for a corresponding token using the MDN found in the caller ID information. When a matching token is found in a queue, the session of the user of mobile device 15 may be reactivated or requeued as further discussed below in the steps of FIG. 3. The term "requeue" means to place an item back in a queue after that item has been removed from the queue.

Figure 3:
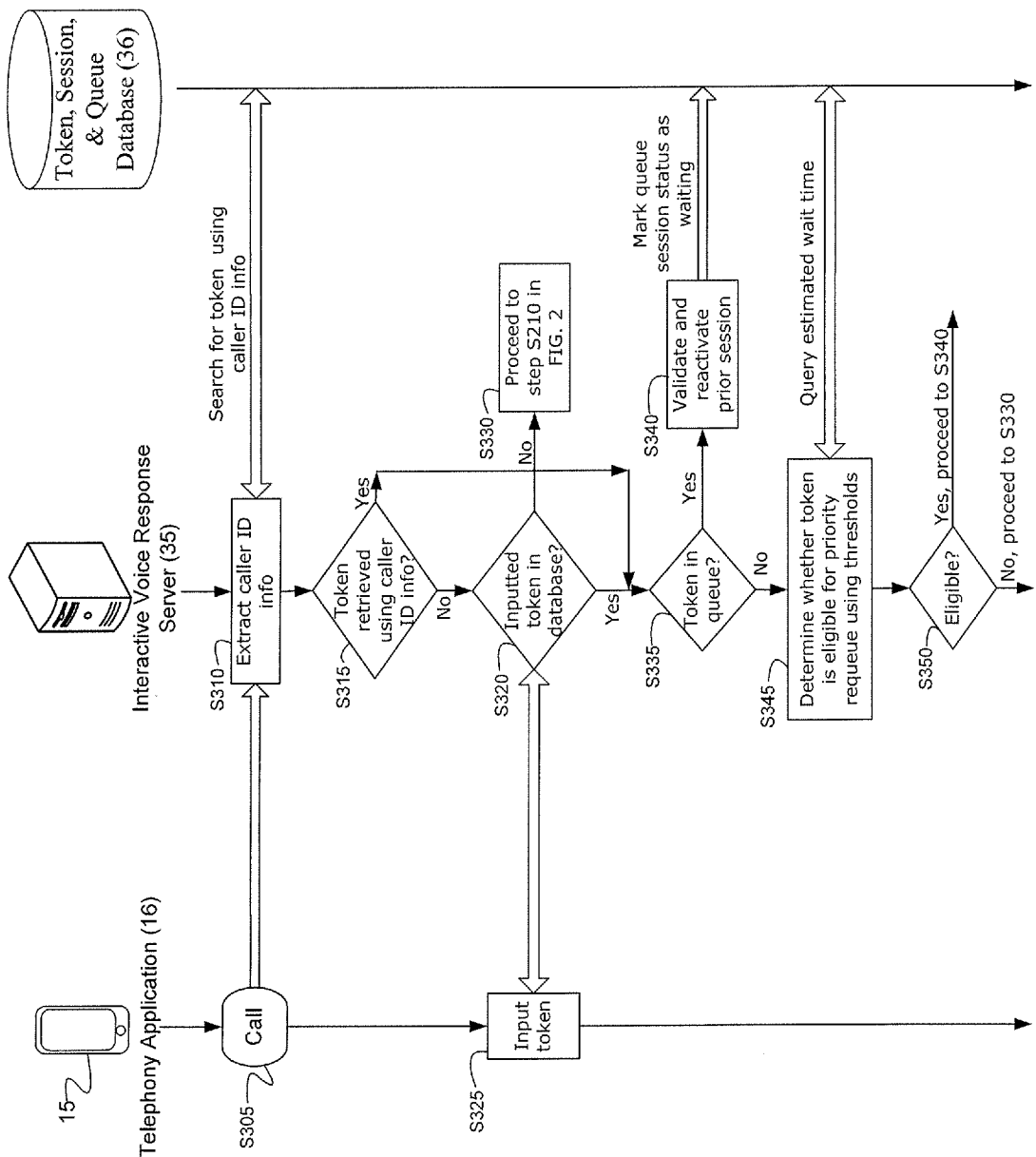
FIG. 3 is a flow chart of a procedure for reactivating or requeuing a session with a priority token at an Interactive Voice Response Server during a subsequent communication connection.

FIG. 3 illustrates a procedural flow for reactivating or requeuing a session with a priority token at an IVR Server 35 during a subsequent communication connection, such as a subsequent call. In the illustrated example, the mobile device 15 is in communication with the carrier network 10.

To initiate the procedure, in step S305, the telephony application 16 that resides on mobile device 15 initiates a call to a phone number, is directed to a contact center, and is then routed to the IVR Server 35. The telephony application 16 places an outgoing call in response to receiving touchtone key input from the user. As part of this second communication connection, the telephony application 16 transmits caller identification ("caller ID") information to the IVR Server 35. Such caller ID information includes the caller's telephone number, which in the illustrated example is the mobile directory number ("MDN") of a first communication device (e.g., mobile device 15). Alternatively, the caller ID information may be a SIP address, IP address, IMEI, or TIMSI of the first communication device (e.g., the mobile device 15), each of which may be transmitted to the IVR Server 35 from the mobile device 15 or other devices and servers, such as Carrier ID Server 28.

Proceeding to step S310, the IVR Server 35 extracts the caller ID information from the messages exchanged between mobile device 15 and IVR Server 35 over the second communication connection. After extracting the caller ID information, IVR Server 35 accesses the token, session, & queue database 36 and then searches the database for a corresponding token using the caller ID information. Recall that the telephone number that originated each session is stored in the token, session, & queue database 36 as a field that is embedded within the token string. Thus, the IVR Server 35 searches for a matching token in the token, session, & queue database 36 that was generated in a previous call of a prior session from the mobile device 15.

Continuing now to step S315, when a matched token is retrieved from the token, session, & queue database 36, the procedure flow branches to step S335 which is discussed in further detail later. One the other hand, when no token match is found in the token, session, & queue database 36, step S320 is reached.

In step S320, the IVR Server 35 transmits a message to the mobile device 15 requesting input of a token. The token input request from the IVR Server 35 may entail executing menu scripts, such as playing recorded audible menu scripts and transmitting audio data back to telephony application 16 of mobile device 15 via voice or data packets. The audible menu scripts can request the user of mobile device 15 to input a token from a previous call via keypad input, speech, SMS message, chat messaging, email, or other applications 14A-N to facilitate customer interaction crossover among different media types. The menu script may also prompt the user to bypass the token input process if the user does not possess a token.

Moving now to step S325, the user of mobile device 15 inputs a token via keypad touches and the inputted token is then transmitted from the telephony application 16 to the IVR Server 35. Alternatively, applications 14A-N residing on mobile device 15, such as SMS message, instant message, email message, web browser, etc. may be used to transmit the token from mobile device 15 to IVR Server 35.

Returning to step S320, in response to receiving the inputted token from mobile device 15, the IVR Server 35 checks for the received token input in the token, session, & queue database 36. When a match is not found for the inputted token, this indicates that the received token is either invalid (i.e., no token exists with that number) or was purged from the token, session, & queue database 36. Accordingly, when no match is found for the inputted token, the program flow branches to step S330, which is the entry point for S210 of FIG. 2 to issue a new token to telephony application 16 of mobile device 15.

Moving now to step S335, when the received token is found in the token, session, & queue database 36, the IVR Server 35 checks if the token is still in a queue table of the queue. In step S340, a prior session with a linked token that resides in the queue table (see FIG. 4B) is validated and reactivated on the mobile device 15. The IVR Server 35 validates such sessions by updating the call status of the session entry in the queue table of the token, session, & queue database 36 to indicate that the mobile device 15 is waiting (i.e., the call status is active), instead of disconnected (i.e., the call status is inactive). When the session status is updated to waiting, the state information from the prior session becomes available and the mobile device 15 is established as the recipient of future communications for that prior session over the subsequent call connection, thereby reactivating the session. For example, the subsequent call connection may be linked to the session ID of the prior session.

Alternatively, in step S345, when the token that is linked to a session is not found in a queue table and is instead found in a queue removal table (see FIG. 4C), the IVR Server 35 determines whether the token is eligible for priority requeuing in the queue table. When a session reaches the front of the queue but is in a disconnected state, meaning the call is ready to be answered by an agent at the contact center but a customer device is not connected or otherwise active on the call, then that session is removed from the queue. In such a situation, the session, linked token, and estimated wait time are moved into a corresponding session entry of the queue removal table of the token, session, & queue database 36. Because the date and time that the session ID resolved to the queue is embedded within the linked token, the IVR Server 35 compares this information with the date and time that the session reached the front of the queue to determine the total (i.e., overall) session time to write into the corresponding session entry of the queue removal table. In the event that the total session time is less than the estimated wait time, the IVR Server 35 may place an automatic call to mobile device 15 using the embedded telephone number that is stored in the token before moving the session and linked token into the queue removal table. Such removed sessions are maintained in the queue removal table and IVR Server 35 may periodically purge the queue removal table of abandoned sessions and linked tokens at set time intervals, such as every 30 minutes. The time interval for purging the queue removal table can be adjusted so that the interval is decreased when the number of session entries (or tokens) in the queue table increase, and the interval is increased when the number of session entries (or tokens) in the queue table decrease. For example, the time interval may be inversely related to the number of session entries (or tokens) in the queue table.

To determine whether a token and associated session are eligible for priority requeuing in step S345 and during the periodic purging process, the IVR Server 35 calculates the overall session time by determining the current date and time (e.g., 13:50 on Aug. 22, 2014) and subtracts the date and time embedded in the linked token (e.g., 13:20 on Aug. 22, 2014) to ascertain the total session time (13:50-13:20=30 minutes). This total session time is then compared to the estimated wait time by subtracting the estimated wait time from the total session time to find the time differential. If the time differential exceeds a purge time threshold, then the session is purged from the queue removal table and hence the token, session, & queue database 36, and the token and session become invalid. On the other hand, if the time differential does not exceed the purge time threshold, the session is maintained in the queue removal table. Typically, a purge time threshold specifies a time period in minutes that the session should be maintained after the estimated wait time is exceeded. The purge time threshold can be adjusted so that the threshold is decreased when the number of session entries (or tokens) in the queue table increase, and the interval is increased when the number of session entries (or tokens) in the queue table decrease. For example, the purge time threshold may be inversely related to the number of session entries (or tokens).

Continuing now to one side of the branch in step S350, when the IVR Server 35 determines that the token is ineligible for priority requeuing that places the linked session in a priority section of the queue, then a new token is issued to mobile device 15. For example, when the total session time is 35 minutes, the estimated wait time is 20 minutes, and the purge time threshold is 10 minutes, the session and token are purged from the queue removal table. In such a situation, the session and linked token are ineligible for priority requeueing in the queue table. As a result, the token and linked session are purged from the queue removal table. Accordingly, the program flow branches to step S330, which is the entry point for S210 of FIG. 2 to issue a new token to telephony application 16 of mobile device 15.

On the other side of the branch in step S350, when the IVR Server 35 determines that the token is eligible to be placed in a priority section of the queue, the program flow branches to step S340. For example, when the total session time is 28 minutes, the estimated wait time is 20 minutes, and the purge time threshold is 10 minutes, the session and token remain in the queue removal table. In such an event, the session and linked token are eligible for priority requeueing in the queue table. Consequently, the token and linked session are moved back into the queue table and the queue status of the session is set to priority to indicate that the session should be grouped and thereby scheduled with session entries that have the same estimated wait time or a similar estimated wait time in the queue table. Alternatively, the priority requeue may schedule the token and linked session in the queue table with session entries having a lower estimated wait time than the estimated wait time of the linked session, such as one-half, one-third, or one-quarter the estimated wait time of the linked session, or with session entries that have a predetermined shortened wait time, such as five or ten minutes.

FIG. 4A is an example of a database structure employed to resolve a set of menu selection identifiers to a queue. The database table 400 shown is accessible to IVR Server 35. With reference to FIG. 4A, the queue resolution table 400 contains queues A-N (representative of any number of queues) with queue identifiers ("queue IDs") listed as A-N. As shown in the queue subject column 410, each queue segments customer populations into distinct subpopulations based on the type of customer inquiry. Shown in column 415 is the set of menu selection identifiers that, when selected in the sequence shown in response to an audible menu script, would resolve to the given queue identifier of the queue.

FIG. 4B is an example of database table structure employed to implement a queue. The queue table 420 illustrated is accessible to the IVR Server 35. In column 425, a token that is generated for a session is illustrated. Shown in column 430 is the corresponding session ID of the session that the token is linked to. The estimated wait time that the customer was provided for the session when the token was generated and transmitted to the customer is shown in column 435. Finally, column 440 shows the session status. The queue example of FIG. 4B is a first-in first-out list, thus the session entry at the top of table 420 is at the front of the queue and will be served next.

FIG. 4C is an example of a database structure generated to store a session that reached the front of the queue table of FIG. 4B but was in a disconnected state, meaning the call was ready to be answered by an agent at the contact center but a customer device was not connected or otherwise active on the call. The queue removal table 445 illustrated is accessible by Upgrade Server 35 and stores information regarding the session that was transferred from the queue table 420 of FIG. 4B. Shown in column 450 is the token of the removed session. Similarly column 455 shows the session ID and column 460 shows the estimated wait time of the removed session. Finally, column 465 shows the total session time since the token was first generated and thus the session originally resolved to queue table 420.

Figure 5:
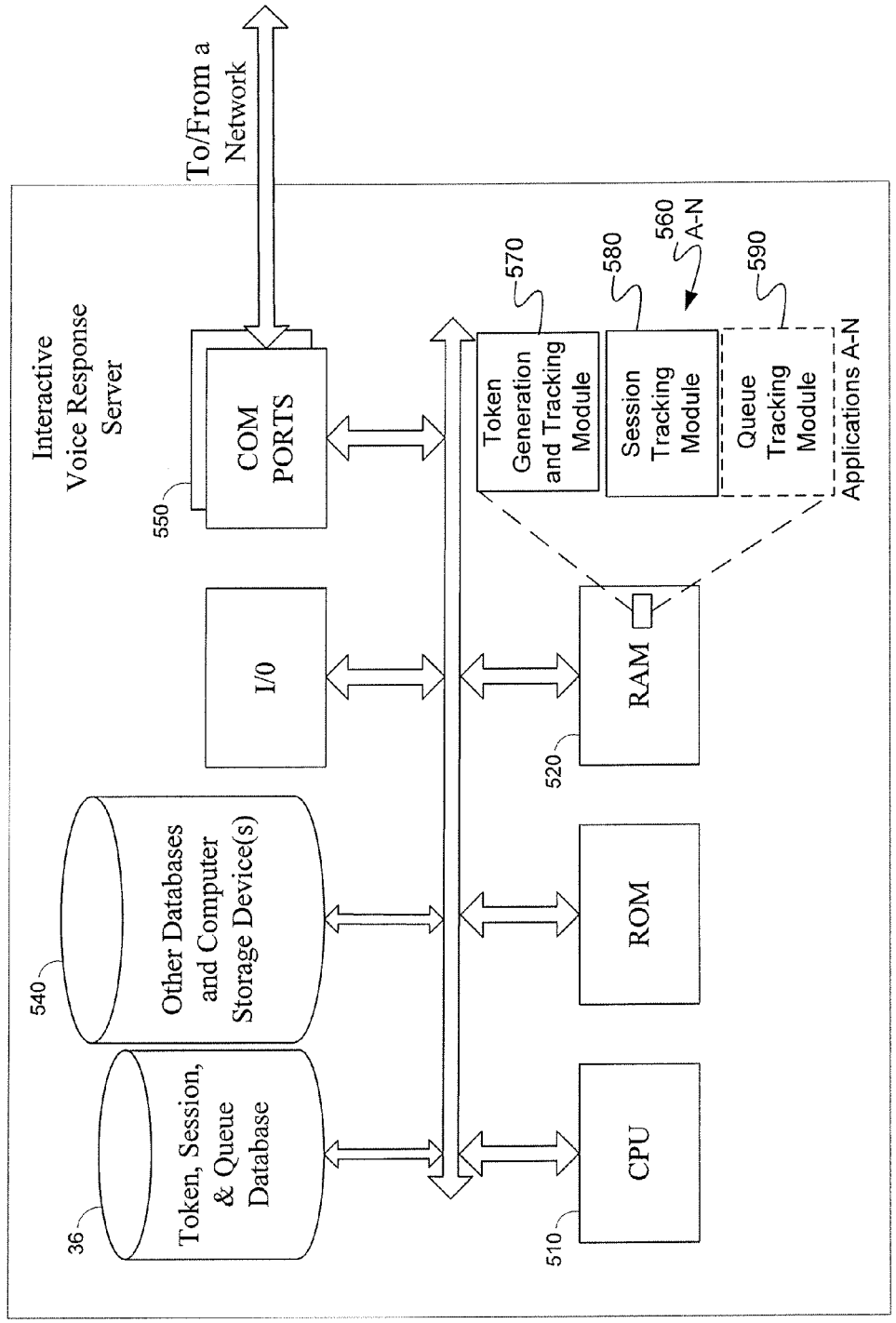
FIG. 5 is a simplified functional block diagram of a computer that may be configured as a server or host to function as any of the computer platforms in FIG. 1, for example, the Interactive Voice Response Server shown in the system of FIG. 1.

FIG. 5 is a simplified functional block diagram of a computer that may be configured as a server or host to function as any of the computer platforms in FIG. 1, for example, the IVR Server 35 shown in the system 5 of FIG. 1.

The IVR Server 35 includes a CPU 510, in the form of one or more processors, for executing program instructions. Although the processor(s) forming the CPU 510 may be similar to the microprocessor used in the mobile device 15 of FIG. 6, host or server computer platforms typically use somewhat different circuit architectures, e.g. to provide more processor power. IVR Server 35 also includes a memory 520, shown as RAM, that is accessible to the processor to execute various programming instructions. The memory 520 typically stores programming, such that execution of the programming by the processor 510 configures the IVR Server 35 to perform the functions or procedures as described above. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

In this particular example, the IVR Server 35 is shown as including the token, session, & queue database 36 discussed earlier. The token, session, & queue database 36 is accessible to the central processing unit (CPU) 510 of the IVR Server 35. Additional databases and computer storage device(s) 540 are also accessible, such as those storing additional session information that is accessible to the IVR Server 35.

As outlined earlier, priority token-based communications that are effectuated and scheduling by IVR Server 35 involves reactivation of sessions in a queue table in response to receiving a linked token as input during a subsequent call and scheduling removed sessions from the queue removal table. The exchanged data may be obtained in several different ways, including from telephony application 16 of mobile device 15.

For packet data communication, IVR Server 35 includes a data/network communication interface, shown generally as com ports 550. The com ports 550 may use any available data communication technology. In a fixed installation, for example, the com ports 550 may include an Ethernet interface card for communication over appropriate data network wiring. For a wireless implementation, the com ports 550 may include a WiFi transceiver. The com ports 550 allow the IVR Server 35 to communicate with other devices and systems, such as telephony application 16 of mobile device 15.

In the illustration, IVR Server 35 includes several applications 560A-N stored in RAM 520. Specifically, IVR Server 35 includes a token generation module 570, session tracking module 580, and queue tracking module 590. In general, the term "module," as used herein, refers to logic embodied in hardware or software instructions, which can be written in a programming language, such as Java™, C, C++, for example. A software module can be compiled into executable programs or written in interpreted programming languages, such as Perl or Visual Basic script. Software modules may be callable from other modules. Generally, the modules described herein refer to logical modules that may be merged with other modules or divided into sub-modules despite their physical organization. The modules can be stored in any type of computer readable medium or computer storage device and be executed by one or more general purpose computers. In addition, the methods and processes disclosed herein can alternatively be embodied in specialized computer hardware or an application specific integrated circuit ("ASIC").

The token generation module 570 is tasked with segmenting a call inquiry into a queue, generating and assigning tokens, including storing token identifiers in the token, session, & queue database 36, and other steps of FIG. 2 discussed earlier. Session tracking module 580 performs the session validation, reactivation, and other steps of FIG. 3 discussed above. The queue tracking module 590 removes sessions from a queue, purges the queue removal table, determines whether a session is eligible for priority requeueing, and performs other steps of FIG. 3 discussed previously.

Figure 6:
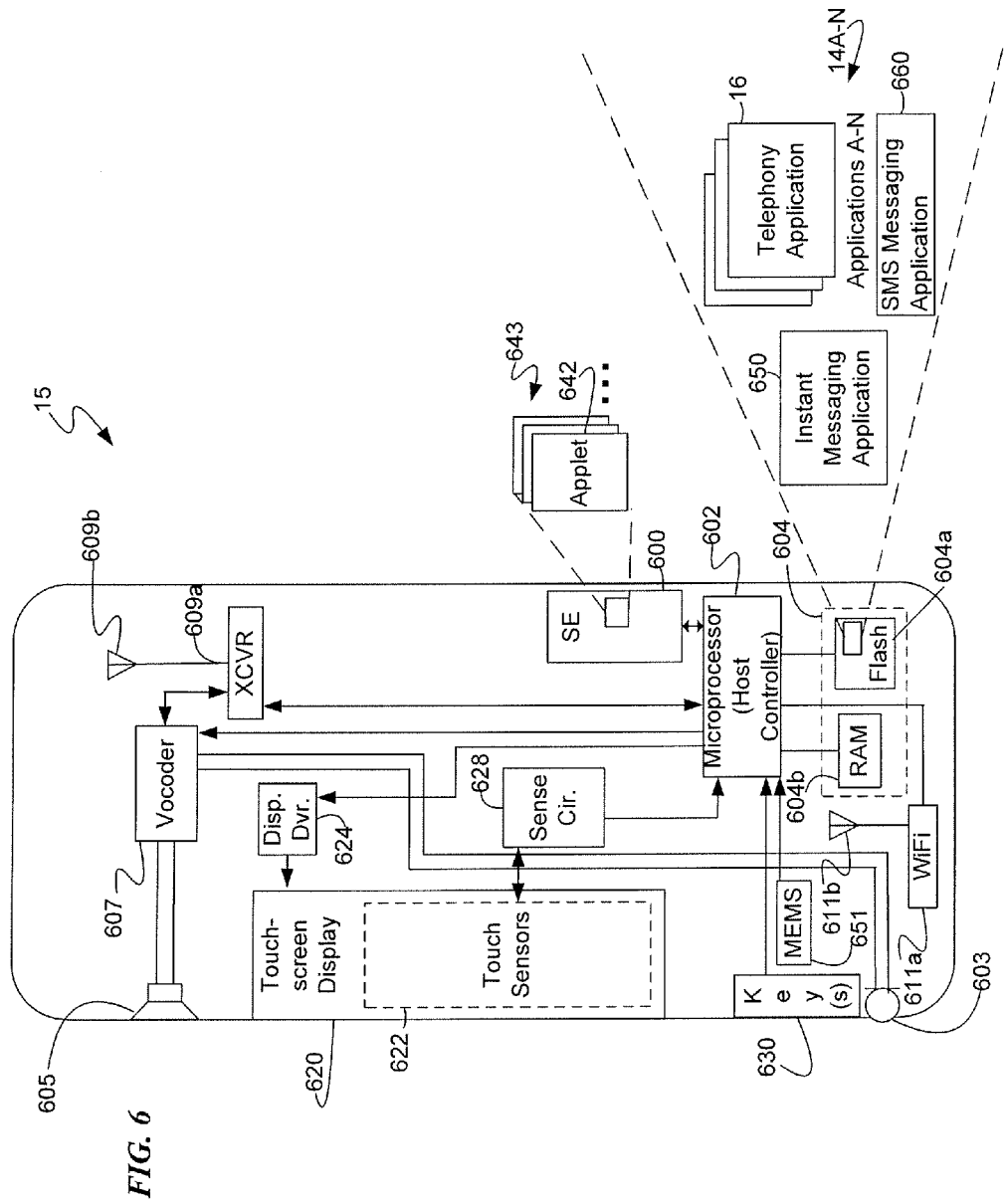
FIG. 6 is a high-level functional block diagram of a mobile device that communicates via the system of FIG. 1.

FIG. 6 is a high-level functional block diagram of an example of a mobile device in the system of FIG. 1. Shown are elements of a touch screen type of mobile device 15 having the telephony application 16 loaded, although other non-touch type mobile devices can be used in the prior token-based communications under consideration here. Examples of touch screen type mobile devices that may be used include (but are not limited to) a smart phone, a personal digital assistant (PDA), a tablet computer or other portable device with biometric sensing capability. However, the structure and operation of the touch screen type devices 15 is provided by way of example; and the subject technology as described herein is not intended to be limited thereto. For purposes of this discussion, FIG. 6 therefore provides a block diagram illustration of the example of mobile device 15 having a touch screen display for displaying content and receiving user input as (or as part of) the user interface.

The activities that are the focus of discussions here may involve both voice and data communications. Hence, in the example shown in FIG. 6, mobile device 15 includes a microphone 603 for audio signal input and a speaker 605 for audio signal output. The microphone 603 and speaker 605 are communicatively coupled to a voice or audio encoder/decoder (vocoder) 607. For a voice telephone call, for example, the vocoder 607 provides two-way conversion between analog audio signals representing speech or other audio and digital samples at a compressed bit rate compatible with the digital protocol of wireless telephone network communications or voice over packet (e.g., Internet Protocol) communications.

Also, as shown in FIG. 6, the mobile device 15 includes at least one digital transceiver (XCVR) 609a, for digital wireless communications via a wide area wireless mobile communication network, although the device 15 may include additional digital or analog transceivers (not shown). The transceiver 609a (network communication interface) conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, transceiver 609a provides two-way wireless communication of information including digitized audio signals, still image and/or video signals, web page information for display as well as web related inputs, and various types of mobile message communications to/from the mobile device 15.

Several of these types of communications through the transceiver 609a and a network, as discussed previously, relate to protocols and procedures in support of priority token-based communications with the Interactive Voice Response Server 35. Such communications, for example, may utilize IP packet data transport utilizing the digital wireless transceiver (XCVR) 609a and over the air communications to and from a base station 22, the traffic portion of network 10, the Intranet 21 to and from the IVR Server 35 shown in FIG. 1.

In one example, the transceiver 609a also sends and receives a variety of signaling messages in support of various voice and data services provided by a network of a wireless service provider, to user(s) of mobile device 15 via the mobile communication network 10. Transceiver 609a connects through radio frequency (RF) send-and-receive amplifiers (not shown) to an antenna 609b. Transceiver 609a may also support various types of mobile messaging services, such as short message service (SMS), enhanced messaging service (EMS), and/or multimedia messaging service (MMS). Although communications involving data for priority token-based communications may utilize IP data transport, such communications may at times utilize one or more of these mobile messaging services for the data transport of some or all of the relevant data through the mobile communication network 10.

Many modern mobile device(s) 15 also support wireless local area network communications over WiFi, instead of or in addition to data communications using the wide area mobile communication network. Hence, in the example of FIG. 6, for packet data communications, device 15 may also include a WiFi transceiver 611a and associated antenna 611b.

Although WiFi is used here as the example, the transceiver 611a may take the form of any available two-way wireless local area network (WLAN) transceiver of a type that is compatible with one or more standard protocols of communication implemented in wireless local area networks, such as one of the WiFi standards under IEEE 802.11 and/or WiMAX.

The transceiver 611a, for example, may provide two-way data transport for wireless communication with a wireless access point in a residence or enterprise that the user frequents or with any available hotspot offered in a public venue. A WiFi access point (reference numeral 51 of FIG. 1), communicates with compatible user equipment, such as the device 15, over the air using the applicable WiFi protocol. The WiFi access point provides network connectivity, usually to the public Internet 30. In a home or office premises, for example, the WiFi access point would connect directly or via a local area network (LAN) to a line providing internet access service. In a more public venue, an access point configured as a hotspot may offer similar connectivity for customers or others using the venue, on terms and conditions set by the venue operator. Although communicating through a different network or networks, the transceiver 611a supports various types of data communications similar to the packet data communications supported via the mobile network transceiver 609a, including communications related to communications to and from IVR Server 35 and the other devices shown in FIG. 1.

The mobile device 15 further includes a microprocessor, sometimes referred to herein as the host controller 602. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 602, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in mobile device 15, IVR Server 35, carrier devices and server computers, network elements, etc.

Returning more specifically to the mobile device 15 example of FIG. 6, the microprocessor 602 serves as a programmable host controller for device 15 by configuring device 15 to perform various operations, for example, in accordance with instructions or programming executable by processor 602. For example, such operations may include various general operations of the mobile device 15, as well as operations related to communications with IVR Server 35. Although a processor may be configured by use of hardwired logic, typical processors in mobile devices are general processing circuits configured by execution of programming.

The mobile device 15 includes a memory or storage system 604, for storing data and programming. In the example, the memory system 604 may include a flash memory 604a and a random access memory (RAM) 604b. The RAM 604b serves as short term storage for instructions and data being handled by the processor 602, e.g. as a working data processing memory. The flash memory 604a typically provides longer term storage.

Hence, in the example of mobile device 15, the flash memory 604a is used to store programming or instructions for execution by the processor 602. Depending on the type of device, the device 15 stores and runs a mobile operating system through which specific applications 14A-N, including telephony application 16, instant messaging application 650, SMS messaging application 660, etc. may be run on the device. Examples of mobile operating systems include Google Android, Apple iOS (I-Phone or iPad devices), Windows Mobile, Amazon Fire OS, RIM BlackBerry operating system, or the like. Flash memory 604a may also be used to store mobile configuration settings for different mobile applications 14A-N or services executable at device 15 using processor 602.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming may be used to implement any other device functions associated with priority-token based communications on mobile device 15. Program aspects of the technology may be thought of as "products" or "articles of manufacture" typically in the form of executable code or process instructions and/or associated data that is stored on or embodied in a type of machine or processor readable medium (e.g., transitory or non-transitory), such as one of the memories 604a, 604b of memory system 604, or a memory of a computer used to download or otherwise install such programming into the mobile device, or a transportable storage device or a communications medium for carrying program for installation in the mobile device 15.

In the example, the flash memory 604a stores a number of applications 14A-N for execution by the microprocessor-based host controller 602, typically through operation/execution of the device operating system. Of note, for purposes of the present discussion, the flash memory 604 stores a telephony application 16 as one of the programs 14A-N for execution by the microprocessor 602. Execution of telephony module 17 by the microprocessor 602 configures mobile device 15 to perform a variety of functions, particularly to talk over telephone or video phone to phone-connected resources. In the example, telephony application 16 engages in voice communications with the IVR Server 35 in the token-based exchanges and sessions under consideration here.

In the illustrated example, the mobile device 15 includes a secure component 600. The secure component 600 (e.g. a secure element or "SE") may be provisioned as a section within the memory 604 or may take the form of a universal integrated circuit card ("UICC") located within the device 15. A common example of a UICC implementation of the SE 600 is a subscriber identity module ("SIM"). As discussed above, the SE provides secure storage for various identifiers associated with mobile device 15. The SE typically has a unique identifier and is provisioned for operation of the mobile device 15 in the network 10 by storage of a mobile directory number ("MDN") and/or mobile identification number ("MIN") assigned to the device 15 by the carrier network operator.

The secure component contains applications that use secure keys running inside the secure processor. Although similar to other applications, the applications for the secure processor are sometimes smaller and sometimes referred to as applets 643. In an example, telephony application 16 may be an applet residing in the SE 600. For example, there may be at least one applet 642 to engage in communications via network 10 to engage in priority token-based communications.

The mobile device 15 supporting priority token-based communications of the type under consideration here may include a variety of different types of physical user interface elements. For discussion purposes, in the device 15 shown in FIG. 6, the physical user interface elements of device 15 includes a touch screen display 620 (also referred to herein as "touch screen 620" or "display 620"). For output purposes, the touch screen 620 includes a display screen, such as a liquid crystal display (LCD) or the like. For input purposes, touch screen display 620 includes a plurality of touch sensors 622.

A keypad may be implemented in hardware as a physical keyboard of mobile device 15, and keys may correspond to hardware keys of such a keyboard. Alternatively, some or all of the keys 630 (and keyboard) of device 15 may be implemented as "soft keys" of a virtual keyboard graphically represented in an appropriate arrangement via touch screen display 620. The soft keys presented on the touch screen display 620 may allow the user of device 15 to invoke the same user interface functions as with the physical hardware keys for authentication purposes.

In general, touch screen display 620 and touch sensors 622 (and one or more keys 630, if included) are used to provide a textual and graphical user interface for the mobile device 15. In an example, touch screen display 620 provides viewable content to the user at device 15. Touch screen display 620 also enables the user to interact directly with the viewable content provided in the content display area, typically by touching the surface of the screen with a finger or an implement such as a stylus.

As shown in FIG. 6, the mobile device 15 also includes a sense circuit 628 coupled to touch sensors 622 for detecting the occurrence and relative location/position of each touch with respect to a content display area of touch screen display 620. In this example, sense circuit 628 is configured to provide processor 602 with touch-position information based on user input received via touch sensors 622. In some implementations, processor 602 is configured to correlate the touch position information to specific content being displayed within the content display area on touch screen display 620. The touch-position information captured by the sense circuit 628 and provided to processor 602 may include, but is not limited to, coordinates identifying the location of each detected touch with respect to the display area of touch screen display 620 and a timestamp corresponding to each detected touch position. Accordingly, the processor 602 may determine input of a phone number, a token, or menu identifiers selected during audible scripts, for example.

Aspects of the methods of priority-token based communication as outlined above may be embodied in programming, for example, for one or more server, mobile, personal computing (PC), landline telephony, or other computing devices. Program aspects of the technology may be thought of as "products" or "articles of manufacture" typically in the form of executable code and/or associated data that is carried on or embodied in a type of machine readable medium. Executable code, for example, may take the form of software, firmware, microcode or the like of a type suitable for execution by the particular processor hardware of the mobile device 15 and IVR Server 35 so as to configure the respective equipment to perform functions like those discussed herein.

"Storage" type media include any or all of the tangible memory of the computers, mobile devices, processors or the like, or associated modules thereof, such as various semiconductor memories, tape drives, disk drives and the like, which may provide non-transitory storage at any time for the programming. All or portions of the programming may at times be communicated through the Internet or various other telecommunication networks. Such communications, for example, may enable loading of the software or modules from one computer or processor into another, for example, from a management server or host computer of the carrier or contact center 34 onto the mobile device 15 or IVR Server 35. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s), mobile devices or the like, such as may be used to implement the secure payment processing techniques discussed herein. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An Interactive Voice Response Server ("IVR Server") comprising:
   a network communication interface;
   a processor;
   a memory accessible to the processor; and
   programming in the memory, wherein execution of the programming by the processor configures the IVR Server to perform functions, including functions to:
      generate a session identifier ("session ID") to identify and track a session for a first communication connection associated with a first communication device;
      transmit communication menu scripts back to the first communication device;
      after transmitting the communication menu scripts, receive a set of one or more menu selection identifiers;
      in response to receiving the set of one or more menu selection identifiers, determine whether the received set of one or more menu selection identifiers are sufficient to route the first communication connection associated with the session ID to a queue indicated by a queue identifier stored in a queue resolution table of a token, session, and queue database;
      upon resolving the set of one or more menu selection identifiers to the queue:
         store the session ID of the session in a queue table for the queue in the token, session, and queue database,
         determine an estimated wait time with respect to the indicated queue, generate a token,
         link the estimated wait time and token to the session by mapping the token and estimated wait time to a same entry as the session ID in the queue table,
         transmit the estimated wait time and token to the first communication device; and
      upon termination of the first communication connection to deactivate the session, maintain the session ID, token, and estimated wait time in the token, session, and queue database.

2. The IVR Server of claim 1, wherein execution of the programming by the processor further configures the IVR Server to perform further functions to:
   when determining the estimated wait time:
      retrieve a number of stored session IDs of sessions in the queue table, a number of contact center agents available to handle the sessions, and average agent time to resolve an inquiry type associated with the queue from the token, session, and queue database; and
      calculate the estimated wait time by multiplying the number of stored session IDs by the average agent time and divide by the number of agents available.

3. The IVR Server of claim 2, wherein execution of the programming by the processor further configures the IVR Server to perform further functions to:
   when generating the token:
      embed a caller's telephone number, a session initiation protocol address, an internet protocol address, an international mobile equipment identity, or a temporary international mobile subscriber identity of the first communication device as a device identifier field in the token;
      embed a date that is current as an eight character date field in the token; and
      embed a time that is current as a four character time field in the token.

4. The IVR Server of claim 3, wherein execution of the programming by the processor further configures the IVR Server to perform further functions to:
   after resolving the set of one or more menu selection identifiers to the queue:
      store a last menu selection identifier in the token, session, and queue database; and
      link the last menu selection identifier to the session ID in the token, session, and queue database.

5. The IVR Server of claim 4, wherein execution of the programming by the processor further configures the IVR Server to perform further functions to:
   after termination of the first communication connection, receive a second communication connection from the first communication device, the second communication connection including caller identification ("caller ID") information;
   extract the caller's telephone number from the caller ID information; and
   search the token, session, and queue database for the token having the caller's telephone number embedded within the device identifier field.

6. The IVR Server of claim 5, wherein execution of the programming by the processor further configures the IVR Server to perform further functions to:
   upon finding a match in the queue table of the token, session and queue database:
      validate the session linked to the token by updating a session status of the session to indicate a call status is active such that state information from the session becomes available; and
      establish the first communication device as a recipient of future communications for the session over the second communication connection, thereby reactivating the session.

7. The IVR Server of claim 5, wherein execution of the programming by the processor further configures the IVR Server to perform further functions to:
   upon finding a match in the queue table of the token, session and queue database:
   determine whether the token is eligible to be placed back in the queue table by:
      calculating an overall session time,
      subtracting estimated wait time from the calculated overall session time to find a time differential; and
      comparing the time differential against a purge time threshold.

8. The IVR Server of claim 7, wherein execution of the programming by the processor further configures the IVR Server to perform further functions to:
   when the time differential is found to exceed the purge time threshold in the comparing step, issue a new token to the first communication device.

9. The IVR Server of claim 7, wherein execution of the programming by the processor further configures the IVR Server to perform further functions to:
   when the time differential is found to be less than the purge time threshold in the comparing step:
      move the token and linked session back into the queue table; and
      set a queue status of the session to priority to indicate that the session be grouped and scheduled with session entries having same or similar estimated wait times.

10. The IVR Server of claim 7, wherein execution of the programming by the processor further configures the IVR Server to perform further functions to:
   when the time differential is found to be less than the purge time threshold in the comparing step:
      move the token and linked session back into the queue table; and
      set a queue status of the session to priority to indicate that the session be grouped and scheduled with session entries having a lower estimated wait time than the estimated wait time of the session.

11. The IVR Server of claim 7, wherein execution of the programming by the processor further configures the IVR Server to perform further functions to:
   when the time differential is found to be less than the purge time threshold in the comparing step:
      move the token and linked session back into the queue table; and
      set a queue status of the session to priority to indicate that the session be grouped and scheduled with session entries having a predetermined shortened wait time.

12. The IVR Server of claim 7, wherein execution of the programming by the processor further configures the IVR Server to perform further functions to:
   when calculating the overall session time:
      determine a current date and a current time; and
      subtract the eight character date field and the four character time field embedded within the token from the current date and the current time to find the overall session time.

13. The IVR Server of claim 7, wherein execution of the programming by the processor further configures the IVR Server to perform further functions to:
   adjust the purge time threshold to increase as number of tokens in the queue table decrease and decrease the purge time threshold as the number of tokens in the queue table increase.

14. The IVR Server of claim 13, wherein the purge time threshold is inversely related to the number of tokens in the queue table.

15. The IVR Server of claim 4, wherein execution of the programming by the processor further configures the IVR Server to perform further functions to:
   after termination of the first communication connection, upon finding the session has reached a front of the queue table but is in a disconnected state:
      move the session, the linked token, and the estimated wait time into a corresponding session entry of a queue removal table of the token, session, and queue database; and
      periodically purge the queue removal table of sessions and linked tokens at a time interval.

16. The IVR Server of claim 15, wherein execution of the programming by the processor further configures the IVR Server to perform further functions to:
   adjust the time interval to increase as number of tokens in the queue table decrease and decrease the time interval as the number of tokens in the queue table increase.

17. The IVR Server of claim 16, wherein the time interval is inversely related to the number of tokens in the queue table.

18. The IVR Server of claim 15, wherein execution of the programming by the processor further configures the IVR Server to perform further functions to:
   upon finding the session has reached the front of the queue but is in the disconnected state:
      determine a current date and a current time;
      subtract the eight character date field and the four character time field embedded within the token from the current date and the current time to find a total session time; and
      write the total session time to the corresponding session entry in the queue removal table.

19. The IVR Server of claim 18, wherein execution of the programming by the processor further configures the IVR Server to perform further functions to:
   when the total session time is less than the estimated wait time of the session, automatically communicate with the first communication device by calling the caller's telephone phone number using the device identifier field embedded within the token before moving the session and linked token into the queue removal table.

20. The IVR Server of claim 15, wherein the time interval to periodically purge the queue removal table is inversely related to a number of session entries in the queue table.

* * * * *